(12) United States Patent
Umeyama et al.

(10) Patent No.: US 10,468,657 B2
(45) Date of Patent: Nov. 5, 2019

(54) ELECTRICAL STORAGE DEVICE AND MANUFACTURING METHOD FOR ELECTRICAL STORAGE DEVICE

(71) Applicant: TOYOTA JIDOSHA KABUSHIKI KAISHA, Toyota-shi, Aichi-ken (JP)

(72) Inventors: Hiroya Umeyama, Okazaki (JP); Kiyomi Kozuki, Moriguchi (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/117,570

(22) PCT Filed: Feb. 10, 2015

(86) PCT No.: PCT/IB2015/000127
§ 371 (c)(1),
(2) Date: Aug. 9, 2016

(87) PCT Pub. No.: WO2015/118404
PCT Pub. Date: Aug. 13, 2015

(65) Prior Publication Data
US 2017/0025662 A1    Jan. 26, 2017

(30) Foreign Application Priority Data

Feb. 10, 2014  (JP) .................................. 2014-023288

(51) Int. Cl.
*H01M 2/26* (2006.01)
(52) U.S. Cl.
CPC .................. *H01M 2/263* (2013.01)

(58) Field of Classification Search
CPC ...................................................... H01M 2/263
See application file for complete search history.

(56) References Cited

U.S. PATENT DOCUMENTS 3,309,235 A  *  3/1967  Teeple, Sr. .......... H01M 2/1083
                                                           429/179
2002/0142211 A1    10/2002  Nakanishi et al.
(Continued)

FOREIGN PATENT DOCUMENTS

| CN | 1172400 C | 10/2004 |
| JP | 2000-294222 A | 10/2000 |

(Continued)

OTHER PUBLICATIONS

Machine Translation JP2007265846(A) (Year: 2007).*

*Primary Examiner* — Jonathan G Leong
*Assistant Examiner* — Victoria H Lynch
(74) *Attorney, Agent, or Firm* — Sughrue Mion, PLLC

(57) ABSTRACT

An electrical storage device includes a polar plate and a collector plate. The polar plate includes a mixture layer and a collector. The collector includes an exposed portion. The exposed portion is exposed from the mixture layer in one end of the polar plate in a width direction. The collector plate includes a facing portion, a projection portion, and a corner portion. The facing portion is opposed to a tip end surface of the exposed portion. The projection portion extends from the facing portion so as to project toward the exposed portion relative to the facing portion. The corner portion is placed in a boundary between the facing portion and the projection portion. The collector plate is welded to the exposed portion in at least part of the corner portion.

12 Claims, 11 Drawing Sheets

AXIAL DIRECTION OF ELECTRODE BODY
WIDTH DIRECTION OF POSITIVE ELECTRODE
WIDTH DIRECTION OF NEGATIVE ELECTRODE
WIDTH DIRECTION OF SEPARATOR

(56) References Cited

U.S. PATENT DOCUMENTS

| | | |
|---|---|---|
| 2004/0191612 A1 | 9/2004 | Akita et al. |
| 2004/0237290 A1 | 12/2004 | Ura |
| 2004/0247998 A1* | 12/2004 | Nakanishi ............. H01M 2/263 429/161 |
| 2010/0216001 A1* | 8/2010 | Byun .................... H01M 2/263 429/94 |
| 2011/0244314 A1 | 10/2011 | Lee et al. |

FOREIGN PATENT DOCUMENTS

| | | |
|---|---|---|
| JP | 2001-256952 A | 9/2001 |
| JP | 2007-250442 A | 9/2007 |
| JP | 2007-265846 A | 10/2007 |
| JP | 2012-056952 A | 3/2012 |
| JP | 2001-160387 A | 6/2012 |

\* cited by examiner ated by an arrow in FIG. 21) of the ridge portion.

ELECTRICAL STORAGE DEVICE AND MANUFACTURING METHOD FOR ELECTRICAL STORAGE DEVICE

BACKGROUND OF THE INVENTION

1. Field of the Invention

The present invention relates to an electrical storage device formed by welding a collector plate to an exposed portion, and a manufacturing method for an electrical storage device.

2. Description of Related Art

Japanese Patent Application Publication No. 2001-256952 (JP 2001-256952 A), Japanese Patent Application Publication No. 2007-250442 (JP 2007-250442 A), and Japanese Patent Application Publication No. 2000-294222 (JP 2000-294222 A) describe that a collector plate is welded to an exposed portion of a polar plate in at least part of a projection portion formed in the collector plate.

In a welding method described in JP 2001-256952 A, an inner peripheral surface (a top face) of an arc-shaped projection portion formed in a collector plate is irradiated with a laser beam so as to melt an exposed portion placed under the arc-shaped projection portion. In a welding method described in JP 2007-250442 A, a peripheral edge of a through hole formed in an inclined surface of a projection portion of a collector plate is irradiated with a high energy line. In a welding method described in JP 2000-294222 A, in a state where a ridge portion formed in a collector plate is pressed against an exposed portion, a laser beam is applied along a longitudinal direction (a straight line indicated by an arrow in FIG. 21) of the ridge portion.

SUMMARY OF THE INVENTION

Generally, in the arc-shaped projection portion, heat is hard to escape from a tip (a bottom end) thereof because of its shape. Accordingly, in the welding method described in JP 2001-256952 A, when the inner peripheral surface of the arc-shaped projection portion is irradiated with the laser beam, a temperature rises at the tip of the arc-shaped projection portion, thereby resulting in that a through hole may be formed. When the through hole is formed in the collector plate, the laser beam is applied toward an electrode body through the through hole. As a result, a separator included in the electrode body is easy to melt, thereby inducing occurrence of internal short-circuit. Even in the welding method described in JP 2007-250442 A, the high energy line might be applied toward an electrode body through the through hole. This induces occurrence of internal short-circuit. If the energy of the energy line to be applied is reduced to prevent this, the collector plate may not be melted. Thus, the control of welding conditions is difficult. On that account, mass-production of an electrical storage device by use of the welding method, a decrease in reliability of the electrical storage device is caused.

Further, in the welding method described in JP 2000-294222 A, when a bottom part (a lower part) of the ridge portion is cooled from a molten state, the bottom part is pulled in a thickness direction of the collector plate so as to shrink. The shrinkage causes a tensile stress in the exposed portion connected to the bottom part of the ridge portion, so that a collector is cut in the exposed portion (FIG. 22). As a result, it is difficult to secure the conduction between the exposed portion and the collector plate, thereby causing an increase of I-V resistance of the electrical storage device, for example.

As such, any of the methods in JP 2001-256952 A, JP 2007-250442 A, and JP 2000-294222 may decrease the performance of the electrical storage device. The present invention provides an electrical storage device excellent in performance and a manufacturing method for the electrical storage device.

An aspect of the present invention relates to a manufacturing method for an electrical storage device. The electrical storage device includes a polar plate and a collector plate. The polar plate includes a mixture layer and a collector. The collector includes an exposed portion. The exposed portion is exposed from the mixture layer in one end of the polar plate in a width direction. The collector plate includes a facing portion and a projection portion. The projection portion projects toward the exposed portion relative to the facing portion. The manufacturing method includes preparing the polar plate, and applying an energy beam to a boundary between the facing portion and the projection portion.

In the above aspect, a surface tension works in a first direction and in a second direction on a molten material obtained by the application of the energy beam. The first direction is a direction distanced from an irradiated position with the energy beam along the facing portion. The second direction is a direction distanced from the irradiated position with the energy beam along a side surface of the projection portion. Hereby, at the boundary, a pool of the molten material is formed without scattering the molten material. Accordingly, it is possible to prevent the molten material from falling down toward the exposed portion. This makes it possible to prevent occurrence of internal short-circuit.

When the application of the energy beam is stopped, the molten material is cooled off to shrink in the first direction and in the second direction. Hereby, it is possible to prevent the molten material from shrinking while being pulled in a thickness direction of the collector plate. This can prevent occurrence of a tensile stress in the exposed portion. Accordingly, it is possible to prevent the collector from being cut in the exposed portion.

The "polar plate" indicates at least one of a positive electrode and a negative electrode or at least one of an anode and a cathode. The "width direction of the polar plate" indicates a direction perpendicular to a longitudinal direction of the polar plate in which no electrode body (described later) is formed, and a direction different from a thickness direction of the polar plate. The "tip end surface of the exposed portion" indicates that end surface of the exposed portion which is placed in an end portion of the polar plate in the width direction.

"The facing portion being opposed to a tip end surface of the exposed portion" includes not only a case where at least part of the tip end surface of the exposed portion makes contact with the facing portion of the collector plate, but also a case where the whole facing portion of the collector plate is placed on an outer side, in the width direction, of the polar plate relative to the tip end surface of the exposed portion so as to cover the tip end surface. It is preferable for the "energy beam" to have an energy that can melt the collector plate, and the "energy beam" is a laser beam or an electron beam, for example.

The "applying an energy beam to a boundary between the facing portion and the projection portion" includes a case where the exposed portion is connected to the collector plate by the application of the energy beam and the exposed portion is integrated with the collector plate. For example, a first collector plate having a first facing portion, and a second collector plate having a second facing portion and a projection portion may be used. At this time, due to the application of the energy beam, the exposed portion, the first collector plate, and the second collector plate are connected to each other, and the first collector plate is integrated with the second collector plate. Further, a third collector plate having a facing portion, and a fourth collector plate having a projection portion may be used. At this time, due to the application of the energy beam, the exposed portion, the third collector plate, and the fourth collector plate are connected to each other, and the third collector plate is integrated with the fourth collector plate.

In the above aspect, the collector plate may further include a corner portion. The corner portion is placed in the boundary between the facing portion and the projection portion. Further, the projection portion may extend from the facing portion. In the above aspect, the manufacturing method may further include preparing the collector plate. Further, the energy beam may be applied to at least part of the corner portion. Hereby, it is possible to prevent the exposed portion from being irradiated with the energy beam.

In the above aspect, an angle formed between the facing portion and the projection portion at the corner portion may be not less than 90° but not more than 120°. If the angle is 90° or more, a contact state between the exposed portion and the projection portion of the collector plate becomes good. If the angle is 120° or less, it is also possible to prevent the molten material from falling down toward the exposed portion, and it is further possible to further prevent occurrence of the tensile stress in the exposed portion.

The "angle formed between the facing portion and the projection portion at the corner portion" indicates a smaller angle among angles formed between the facing portion and the side surface of the projection portion at the corner portion.

In the above aspect, the manufacturing method may further include placing the collector plate and the exposed portion such that a longitudinal direction of the exposed portion and a longitudinal direction of the projection portion intersect with each other in a plan view. This makes it possible to secure a connection strength between the exposed portion and the collector plate.

"In a plan view" indicates a case where the collector plate is placed on the tip end surface of the exposed portion, and the collector plate is viewed from above the collector plate.

According to another aspect of the present invention, an electrical storage device may be manufactured, for example, according to the manufacturing method of an electrical storage device of the present invention. The electrical storage device includes a polar plate and a collector plate. The polar plate includes a mixture layer and a collector. The collector includes an exposed portion. The exposed portion is exposed, from the mixture layer, in one end of the polar plate in a width direction. The collector plate includes a facing portion, a projection portion, and a corner portion. The facing portion is opposed to a tip end surface of the exposed portion. The projection portion extends from the facing portion so as to project toward the exposed portion relative to the facing portion. The corner portion is placed in a boundary between the facing portion and the projection portion. The collector plate is welded to the exposed portion in at least part of the corner portion.

In the above aspect, an angle formed between the facing portion and the projection portion at the corner portion may be not less than 90° but not more than 120°. A longitudinal direction of the exposed portion and a longitudinal direction of the projection portion may intersect with each other in a plan view.

According to the present invention, it is possible to prevent occurrence of internal short-circuit, and to prevent the collector from being cut in the exposed portion.

This makes it possible to increase the performance of the electrical storage device.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
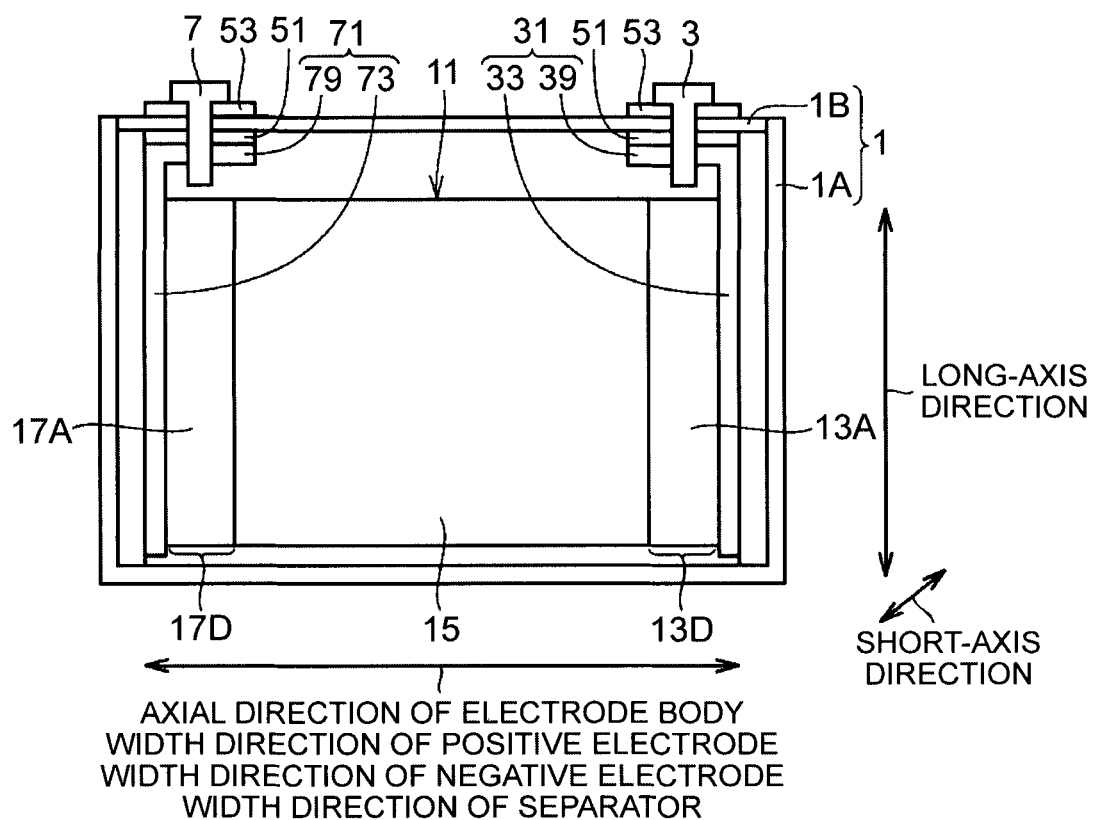
FIG. 1 is a plan view illustrating an internal structure of a nonaqueous electrolyte secondary battery of one embodiment of the present invention.

The following describes the present invention with reference to the drawings. Note that, in the drawings of the present invention, the same reference sign indicates the same portion or an equivalent portion. Further, dimension relationships of length, width, thickness, depth, and the like are changed appropriately for clarification and simplification of the drawings, and do not indicate actual dimension relationships.

The following describes the present invention with taking a nonaqueous electrolyte secondary battery as an example of an electrical storage device. However, the present invention is not limited to the nonaqueous electrolyte secondary battery, and is also applicable to a capacitor, and the like.

Figure 2:
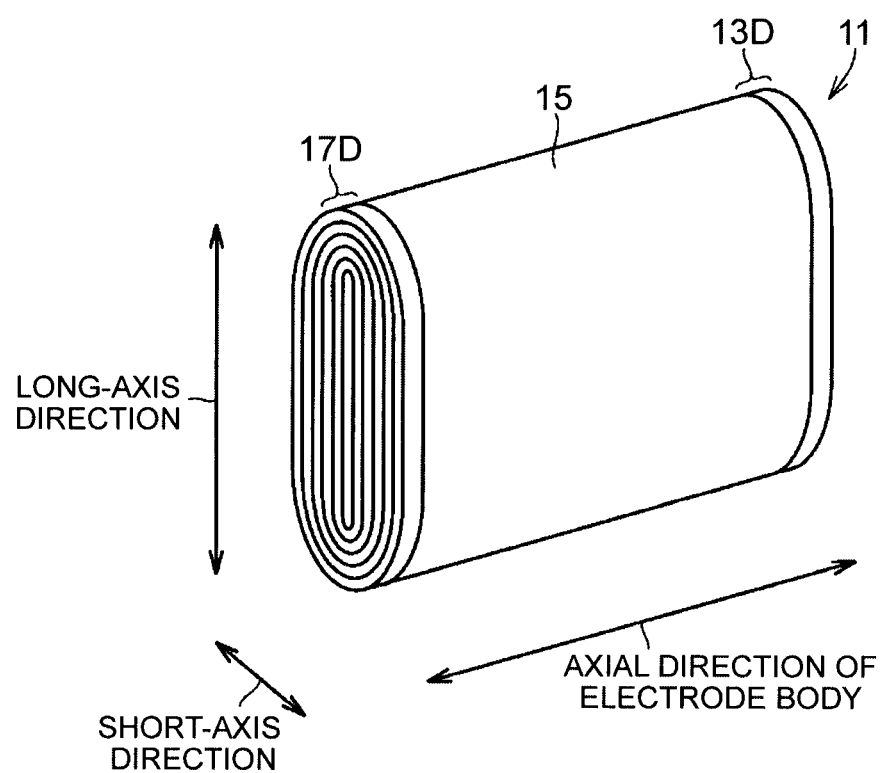
FIG. 2 is a perspective view of an electrode body of one embodiment of the present invention.
Figure 3:
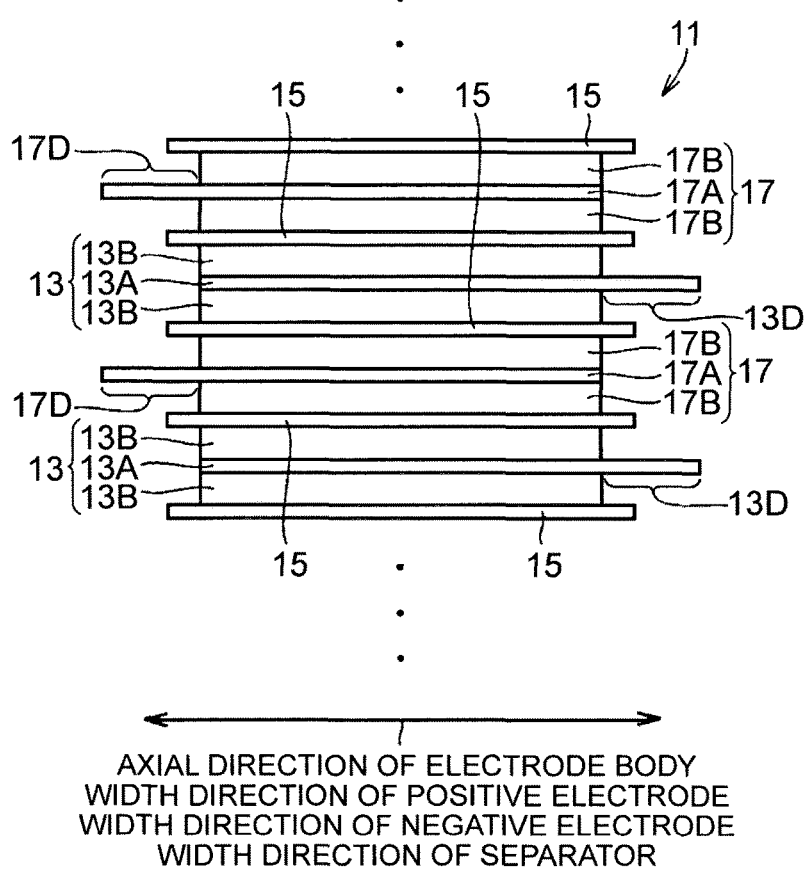
FIG. 3 is a side view of an essential part of the electrode body of one embodiment of the present invention.
Figure 4:
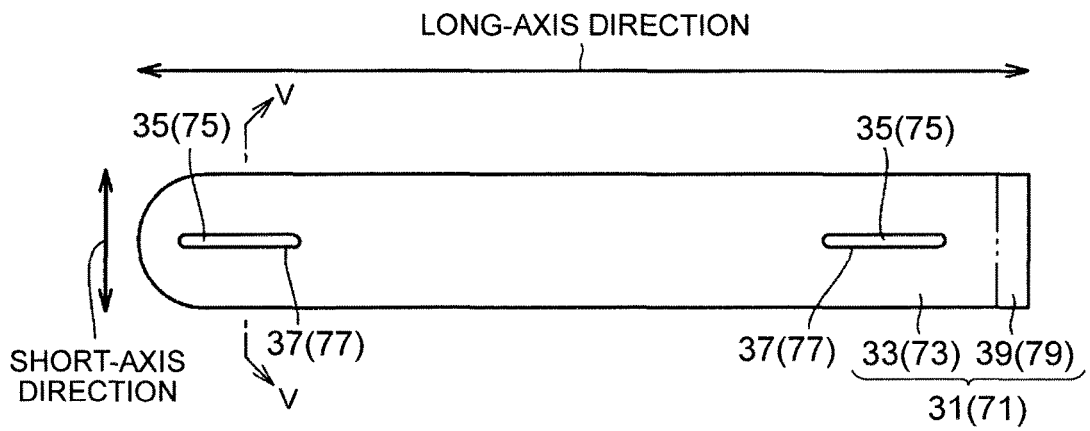
FIG. 4 is a plan view of a collector plate of one embodiment of the present invention.
Figure 5:
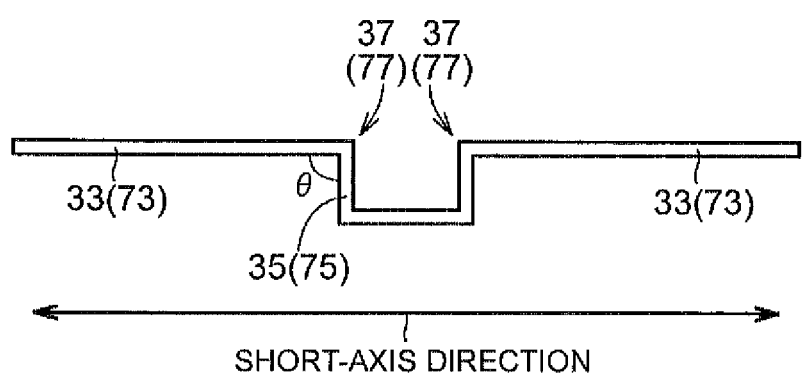
FIG. 5 is a sectional view taken along a line V-V in FIG. 4.
Figure 6:
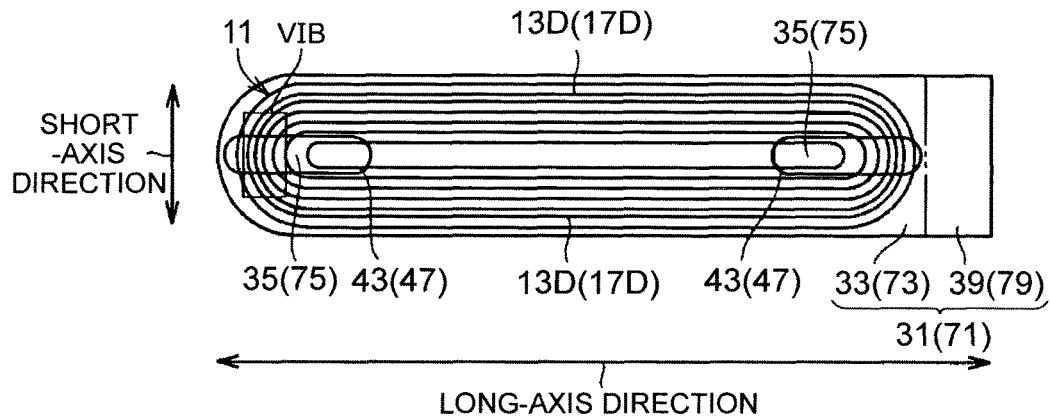
FIG. 6 is a plan view of an essential part of the nonaqueous electrolyte secondary battery of one embodiment of the present invention.
Figure 7:
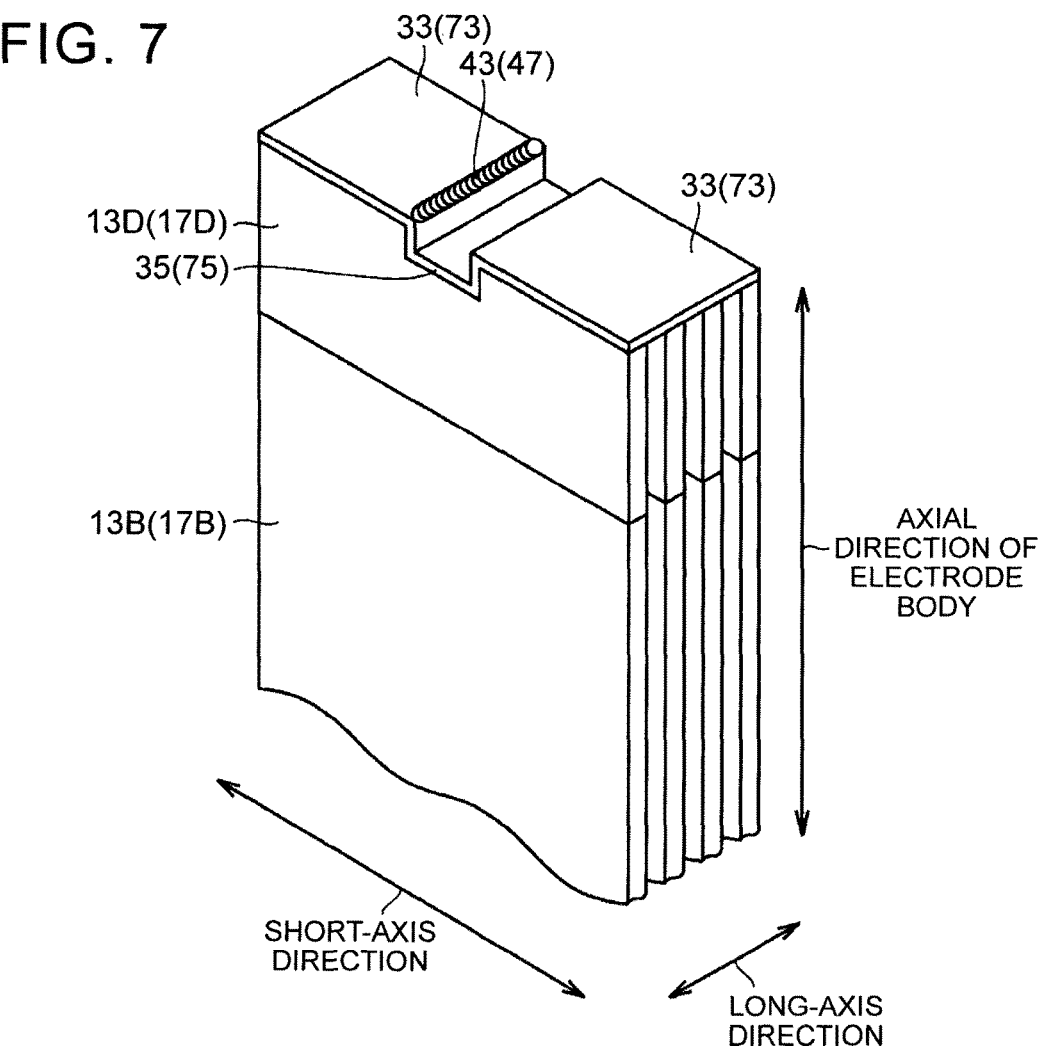
FIG. 7 is a perspective view of a region VIB region illustrated in FIG. 6.

FIG. 1 is a plan view illustrating an internal structure of a nonaqueous electrolyte secondary battery of a first embodiment of the present invention. FIGS. 2 and 3 are a perspective view of an electrode body of the present embodiment and a side view of an essential part thereof, respectively. FIG. 4 is a plan view of a collector plate of the present embodiment, and FIG. 5 is a sectional view taken along a line V-V in FIG. 4. FIG. 6 is a plan view of an essential part of the nonaqueous electrolyte secondary battery of the present embodiment, and FIG. 7 is perspective view of a region VIB illustrated in FIG. 6. In FIG. 1, etc., an "axial direction of an electrode body" indicates a longitudinal direction of a winding shaft used at the time of manufacturing an electrode body 11, and a "long-axis direction" and a "short-axis direction" indicate a long-axis direction and a short-axis direction in a cross section of the electrode body 11, respectively. In the following description, a direction parallel to the long-axis direction may be just referred to as the "long-axis direction," and a direction parallel to the short-axis direction may be just referred to as the "short-axis direction." Further, a "separator width direction" indicates a direction vertical to a longitudinal direction of a separator 15 and different from a thickness direction of the separator 15.

In the nonaqueous electrolyte secondary battery illustrated in FIG. 1, the electrode body 11, a positive collector plate 31, a negative collector plate 71, and an electrolyte are provided in a case main body 1A of a case 1. The electrode body 11 is formed such that a positive electrode 13 and a negative electrode 17 are wound with the separator 15 sandwiched therebetween and are flattened. One end of the positive electrode 13 in a width direction is provided with a positive electrode exposed portion 13D formed such that a positive electrode collector 13A is exposed from a positive electrode mixture layer 13B. One end of the negative electrode 17 in the width direction is provided with a negative electrode exposed portion 17D formed such that a negative electrode collector 17A is exposed from a negative electrode mixture layer 17B. The positive electrode exposed portion 13D and the negative electrode exposed portion 17D project from the separator 15 in reverse directions to each other in an axial direction of the electrode body 11.

The positive electrode exposed portion 13D is connected, via the positive collector plate 31, to a positive terminal 3 provided in a cover 1B of the case 1, and is insulated from the cover 1B by insulating members 51, 53. Similarly, the negative electrode exposed portion 17D is connected, via the negative collector plate 71, to a negative terminal 7 provided in the cover 1B, and is insulated from the cover 1B by insulating members 51, 53.

The positive collector plate 31 includes: a positive electrode facing portion 33 opposed to a tip end surface of the positive electrode exposed portion 13D; a positive electrode side projection portion 35 extending from the positive electrode facing portion 33 and projecting toward the positive electrode exposed portion 13D relative to the positive electrode facing portion 33; a positive electrode side corner portion 37 placed in a boundary between the positive electrode facing portion 33 and the positive electrode side projection portion 35; and a positive electrode extending portion 39 extending from the positive electrode facing portion 33 toward an axially inner side of the electrode body 11. The positive collector plate 31 is welded to the positive electrode exposed portion 13D at the positive electrode side corner portion 37 (a positive electrode side welded portion 43). The positive electrode extending portion 39 is electrically connected to the positive terminal 3.

The negative collector plate 71 includes: a negative electrode facing portion 73 opposed to a tip end surface of the negative electrode exposed portion 17D; a negative electrode side projection portion 75 extending from the negative electrode facing portion 73 and projecting toward the negative electrode exposed portion 17D relative to the negative electrode facing portion 73; a negative electrode side corner portion 77 placed in a boundary between the negative electrode facing portion 73 and the negative electrode side projection portion 75; and a negative electrode extending portion 79 extending from the negative electrode facing portion 73 toward the axially inner side of the electrode body 11. The negative collector plate 71 is welded to the negative electrode exposed portion 17D at the negative electrode side corner portion 77 (a negative electrode side welded portion 47). The negative electrode extending portion 79 is electrically connected to the negative terminal 7. Hereinafter, when the polarity is not limited, a member name is just described without attaching "positive electrode" or "negative electrode" to the head of the member name, and a reference sign of a member for the positive electrode is assigned thereto.

Thus, the collector plate 31 is welded to the exposed portion 13D at the corner portion 37, thereby making it possible to prevent occurrence of internal short-circuit caused due to the application of an energy beam, and further to prevent the collector 13A from being cut in the exposed portion 13D during cooling. Accordingly, it is possible to increase the performance of the nonaqueous electrolyte secondary battery. Consequently, the nonaqueous electrolyte secondary battery of the present embodiment is suitable for a large-size battery used for a power supply for a vehicle such as a hybrid vehicle or an electric vehicle, a power supply for a factory, or a home power supply. Details of the present embodiment are described below.

Figure 8:
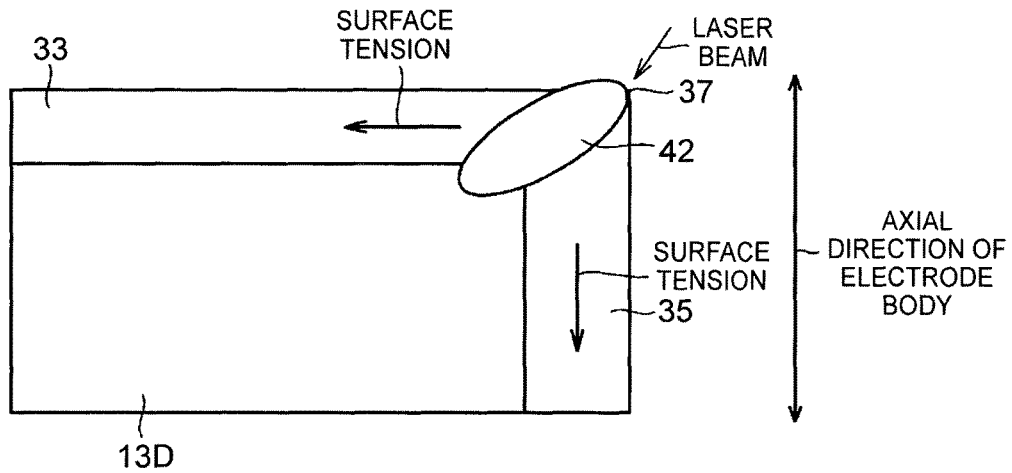
FIG. 8 is a side view schematically illustrating a state when an energy beam is applied to a corner portion.
Figure 9:
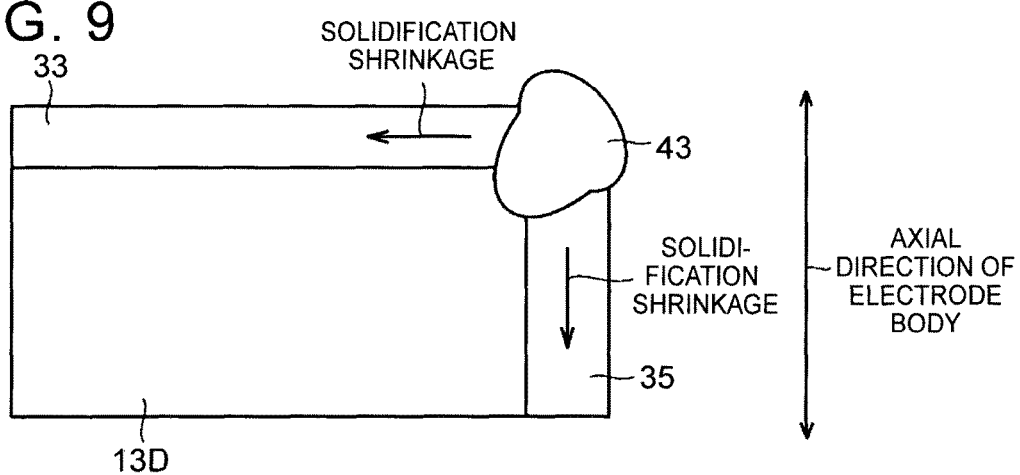
FIG. 9 is a side view schematically illustrating a state when a welded portion is formed.
Figure 10:
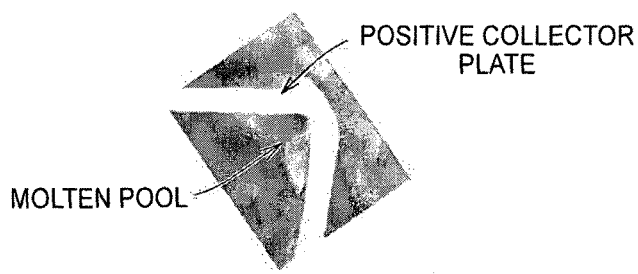
FIG. 10 is a side image when an energy beam is applied to a corner portion of a positive collector plate.
Figure 11:
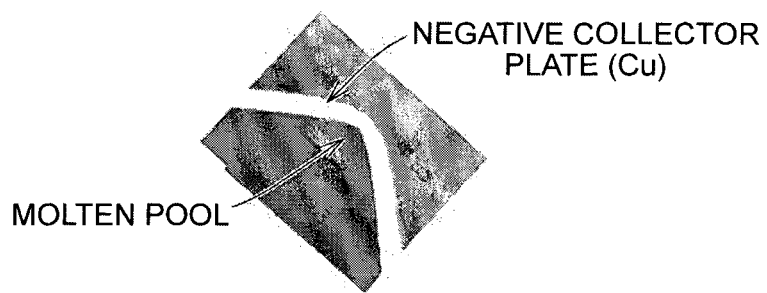
FIG. 11 is a side image when an energy beam is applied to a corner portion of a negative collector plate.

FIG. 8 is a side view schematically illustrating a state when the energy beam is applied to the corner portion 37, and FIG. 9 is a side view schematically illustrating a state when the welded portion 43 is formed. FIG. 10 is a side image when the energy beam is applied to the corner portion of the positive collector plate, and FIG. 11 is a side image when the energy beam is applied to the corner portion of the negative collector plate.

When the corner portion 37 is irradiated with the energy beam, the collector plate 31 is melted at the corner portion 37, so that a molten material 42 is obtained. A surface tension works on the molten material 42 in a direction (a lateral direction) distanced from an irradiated position with the energy beam along the facing portion 33 and in a direction (a lengthwise direction) distanced from the irradiated position with the energy beam along a side face of the projection portion 35. In FIG. 8, the direction distanced from the irradiated position with the energy beam along the side face of the projection portion 35 is at right angles to the direction distanced from the irradiated position with the energy beam along the facing portion 33. Hereby, at the corner portion 37, a pool (molten pool) of the molten material 42 is formed without scattering the molten material 42, thereby making it possible to prevent the molten material 42 from falling down toward the electrode body 11. This makes it possible to prevent occurrence of internal short-circuit.

As a material of the positive collector plate 31, aluminum or aluminum alloy is often used. It is known that a surface tension working on a molten material of aluminum or aluminum alloy is small. However, the inventors of the present invention have confirmed that a molten pool is formed even if a collector plate made of aluminum is used (FIG. 10). Further, copper is often used as a material of the negative collector plate 71, and the inventors of the present invention have confirmed that a molten pool is formed when a collector plate made of copper is used (FIG. 11).

Further, since the energy beam is applied to the corner portion 37, the corner portion 37 is irradiated with the energy beam at an angle inclined to the axial direction of the electrode body 11 (FIG. 8). Hereby, it is possible to secure a distance from the irradiated position with the energy beam to the electrode body 11 (the separator 15, in particular). Besides, it is also possible to prevent the electrode body 11 from being directly irradiated with the energy beam. Accordingly, it is possible to prevent heat shrinkage of the separator 15 due to the application of the energy beam, thereby making it possible to further prevent occurrence of internal short-circuit.

Besides, it is possible to obtain the above effect just by applying the energy beam to the corner portion 37, so that application conditions of the energy beam can be controlled easily. For example, even if an application angle of the energy beam is not controlled, it is possible to prevent formation of spatters or the like, to prevent the electrode body 11 from being directly irradiated with the energy beam, and further to melt the collector plate 31 to such an extent that a connection strength with the exposed portion 13D can be secured sufficiently. This increases the productivity of the nonaqueous electrolyte secondary battery, thereby making it possible to mass-produce a highly reliable nonaqueous electrolyte secondary battery.

Since the molten material 42 is formed by the application of the energy beam, the molten material 42 is formed along an application direction of the energy beam. Hereby, the molten pool is formed to reach a back side (a side to which a tip end surface of the exposed portion 13D) of the corner portion 37 from a front side (a side to which the energy beam is applied) of the corner portion 37. Accordingly, the molten material 42 or the molten pool makes contact with at least the tip end surface of the exposed portion 13D. When the application of the energy beam is stopped in this state, the molten material 42 is cooled off to become a welded portion 43, so that the collector plate 31 is connected to the exposed portion 13D via the welded portion 43.

Since the molten material 42 is cooled off at the corner portion 37, the molten material 42 shrinks in the direction distanced from the irradiated position with the energy beam along the facing portion 33 and in the direction distanced from the irradiated position with the energy beam along the side face of the projection portion 35 (FIG. 9). Hereby, it is possible to prevent the molten material 42 from shrinking while being pulled in the thickness direction of the collector plate 31. This makes it possible to prevent occurrence of a tensile stress in the exposed portion 13D, thereby making it possible to prevent the collector 13A from being cut at the exposed portion 13D. Accordingly, it is possible to increase the electric characteristics of the nonaqueous electrolyte secondary battery. For example, it is possible to prevent an increase in I-V resistance of the nonaqueous electrolyte secondary battery. The following describes the electrode body 11 and the collector plate 31, more specifically.

The electrode body 11 is formed such that the positive electrode 13 and the negative electrode 17 are wound with the separator 15 sandwiched therebetween and are flattened, so the electrode body 11 has a flat part in its center in the long-axis direction, and also has corner parts at both ends in the long-axis direction. In the flat part, the positive electrode 13, the separator 15, and the negative electrode 17 extend in the long-axis direction. In the corner parts, the positive electrode 13, the separator 15, and the negative electrode 17 are formed in an arch shape.

The facing portion 33 preferably abuts with part of the tip end surface of the exposed portion 13D opposed to the facing portion 33, and more preferably abuts with the whole tip end surface. In the meantime, the projection portion 35 is placed on an axially inner side of the electrode body 11 relative to the tip end surface.

It is preferable to determine an outer shape of the facing portion 33 so as to fit an outer shape of that end surface of the electrode body 11 which is placed in an axial end of the electrode body 11. Since the electrode body 11 is a flat electrode body, it is preferable that the outer shape of the facing portion 33 be rectangular.

The projection portion 35 is provided at either end in the long-axis direction (the longitudinal direction of the facing portion 33), and extends in the long-axis direction. At either end in the long-axis direction, the positive electrode 13, the separator 15, and the negative electrode 17 are placed in an arch shape. On that account, a longitudinal direction of the exposed portion 13D and a longitudinal direction of the projection portion 35 intersect with each other in a plan view (FIG. 6). Hereby, two or more exposed portions 13D (in the present embodiment, "exposed portions 13D of different windings") are connected to one collector plate 31.

More specifically, the electrode body 11 is not limited to a flat electrode body (the present embodiment), but may be a cylindrical electrode body (the after-mentioned third embodiment), or may be a laminating electrode body (an electrode body constituted by sequentially laminating a positive electrode, a separator, a negative electrode, and a separator). In either of the cases, if the projection portion 35 is formed in the collector plate 31 so that the longitudinal direction of the exposed portion 13D and the longitudinal direction of the projection portion 35 intersect with each other in a plan view, two or more exposed portions 13D are connected to one collector plate 31. Accordingly, it is possible to secure a connection strength between the exposed portion 13D and the collector plate 31. Note that an angle at which the longitudinal direction of the exposed portion 13D and the longitudinal direction of the projection portion 35 intersect with each other in a plan view should be larger than 0°, and is not limited to 90°.

The configuration of the projection portion 35 is not limited in particular provided that the projection portion 35 projects toward the exposed portion 13D relative to facing portion 33. For example, a height of the projection portion 35 (a size of the projection portion 35 in a projection direction of the projection portion 35) is preferably not less than 0.1 mm but not more than 2 mm. If the height of the projection portion 35 is 0.1 mm or more, the surface tension working on the molten material 42 is easily split into two directions, thereby making it possible to further prevent the molten material 42 from falling down toward the electrode body 11. Further, the molten material 42 is easy to shrink in the two directions thus split, so that it is possible to further prevent occurrence of the tensile stress in the exposed portion 13D. Accordingly, the performance of the nonaqueous electrolyte secondary battery further increases. If the height of the projection portion 35 is 2 mm or less, it is possible to restrain breakage of the exposed portion 13D due to the projection portion 35. The height of the projection portion 35 is more preferably not less than 0.3 mm but not more than 1 mm.

A plane shape of the projection portion 35, the size of the projection portion 35, the number of projection portions 35, and an interval between the projection portions 35 are not limited (see the after-mentioned second embodiment). It is preferable to determine them so as to satisfy a mechanical strength and electric characteristics requested to the collector plate 31.

A position of the projection portion 35 in the collector plate 31 is not limited (see the after-mentioned second embodiment). Preferably, the projection portion 35 is formed in the collector plate 31 so that the longitudinal direction of the exposed portion 13D and the longitudinal direction of the projection portion 35 intersect with each other in a plan view. Such a projection portion 35 can be formed by counterboring or press work, for example.

The side surface of the projection portion 35 may be formed so as to taper toward the electrode body 11. Preferably, the projection portion 35 has an end surface in its tip end in the projection direction, and more preferably, the end surface is parallel to the facing portion 33. This allows the projection portion 35 to easily make surface contact with the exposed portion 13D, thereby making it possible to prevent breakage of the exposed portion 13D due to the contact with the projection portion 35.

Further, it is preferable that an angle θ formed between the facing portion 33 and the projection portion 35 at the corner portion 37 be not less than 90° but not more than 120°. If the angle θ is 90° or more, a contact state between the projection portion 35 and the exposed portion 13D is good, so it is possible to maintain high electric characteristics of the nonaqueous electrolyte secondary battery. If the angle θ is 120° or less, the surface tension working on the molten material 42 is easily split into two directions, so it is possible to further prevent the molten material 42 from falling down toward the electrode body 11. Further, a shrinking direction of the molten material 42 is easily split into the two directions, so it is possible to further prevent occurrence of the tensile stress in the exposed portion 13D. More preferably, the angle θ is not less than 90° but not more than 110°. Note that the corner portion 37 may be round. In this case, an angle formed between a tangent making contact with the facing portion 33 and a tangent making contact with the side surface of the projection portion 35 is considered to be the angle θ.

Figure 12:
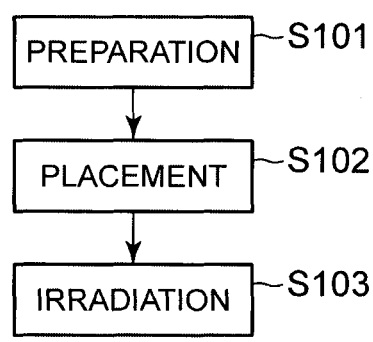
FIG. 12 is a flow diagram illustrating a manufacturing method of the nonaqueous electrolyte secondary battery of one embodiment of the present invention in the order of steps.

FIG. 12 is a flow diagram illustrating a manufacturing method of the nonaqueous electrolyte secondary battery of the present embodiment in the order of steps. In step S101, the electrode body 11 and the collector plate 31 are prepared. Subsequently, in step S102, the facing portion 33 of the collector plate 31 is placed to be opposed to the tip end surface of the exposed portion 13D so that the projection portion 35 is placed closer to the exposed portion 13D than the facing portion 33. Hereby, the facing portion 33 abuts with the tip end surface of the exposed portion 13D, and the projection portion 35 is placed on an axially inner side of the electrode body 11 relative to the tip end surface (see FIG. 7).

Then, in step S103, the energy beam is applied to the corner portion 37. Hereby, the collector plate 31 is melted at the corner portion 37, so that the exposed portion 13D is connected to the collector plate 31 via the welded portion 43 (see FIGS. 8, 9).

Note that, as the application condition of the energy beam, a well-known condition as an application condition of the energy beam at the time when an exposed portion of an electrode body is welded to a collector plate can be used.

After step S103, the electrode body 11 to which the collector plate 31 is connected is placed in the case main body 1A, and the case main body 1A is covered with the cover 1B. After that, an electrolyte is poured from an injection hole formed in the cover 1B, and then the injection hole is sealed. Thus, the nonaqueous electrolyte secondary battery is obtained.

Figure 13:
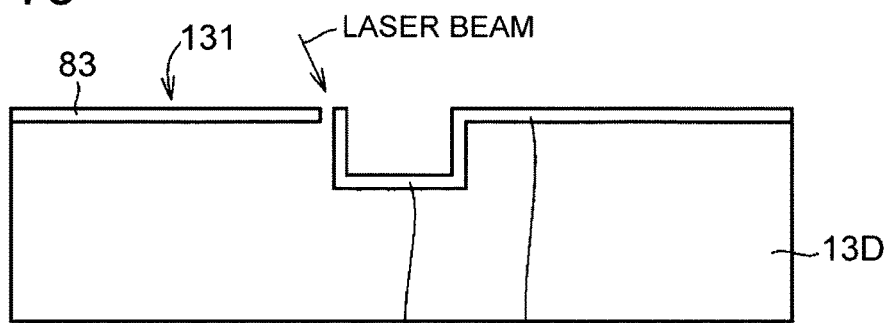
FIG. 13 is a side view illustrating part of a manufacturing method of the nonaqueous electrolyte secondary battery of one embodiment of the present invention.
Figure 14:
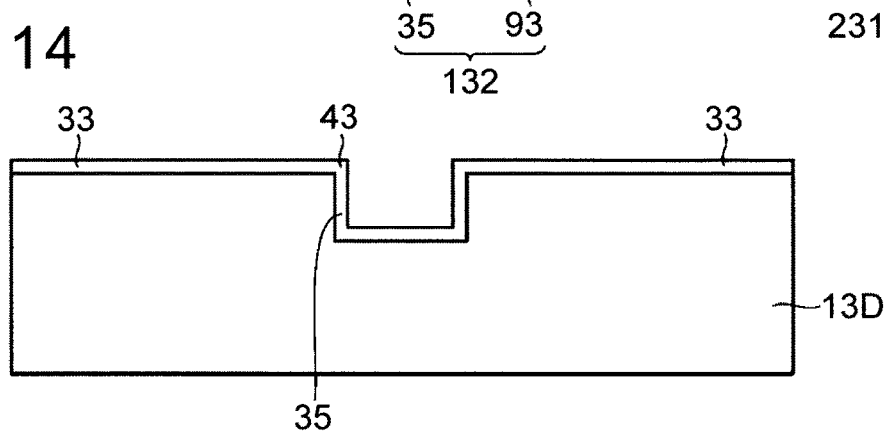
FIG. 14 is a side view illustrating part of the manufacturing method of the nonaqueous electrolyte secondary battery of one embodiment of the present invention.

The nonaqueous electrolyte secondary battery of the present embodiment may be manufactured by use of a collector plate different from the collector plate 31. For example, a collector plate having a through hole or a thinned part formed at a corner portion 37 may be used. Further, the nonaqueous electrolyte secondary battery of the present embodiment may be manufactured according to the following method. FIGS. 13 and 14 are side views each illustrating part of another manufacturing method of the nonaqueous electrolyte secondary battery.

In step S101, instead of the collector plate 31, a first collector plate 131 having a first facing portion 83, and a second collector plate 132 having a second facing portion 93 and a projection portion 35 are prepared.

Then, in step S102, the second facing portion 93 is placed to be opposed to the tip end surface of the exposed portion 13D so that the projection portion 35 is placed closer to the exposed portion 13D than the second facing portion 93. Further, that part of the tip end surface of the exposed portion 13D which is not covered with the second collector plate 132 is opposed to the first facing portion 83 of the first collector plate 131. Hereby, the first facing portion 83 of the first collector plate 131 and the second facing portion 93 of the second collector plate 132 abut with the tip end surface of the exposed portion 13D, and the projection portion 35 is placed on the axially inner side of the electrode body 11 relative to the tip end surface.

Subsequently, in step S103, the energy beam is applied to a boundary between the first facing portion 83 of the first collector plate 131 and the projection portion 35 of the second collector plate 132 (FIG. 13). Hereby, a peripheral edge of the first facing portion 83 and an opening peripheral edge of the projection portion 35, which are adjacent to each other, are irradiated with the energy beam, and hereby melted. Thus, the molten material 42 and the molten pool are formed. When the molten material 42 and the molten pool are cooled off, the first collector plate 131 is integrated with the second collector plate 132, and further, the exposed portion 13D is connected to the first collector plate 131 and the second collector plate 132 in the integrated part (FIG. 14). After that, the electrode body 11 and the electrolyte are placed in the case main body 1A according to the above-mentioned method, and thus, the nonaqueous electrolyte secondary battery of the present embodiment is obtained.

The case where the nonaqueous electrolyte secondary battery is manufactured with the use of the collector plate 31 can prevent the electrode body 11 from being irradiated with the energy beam, in comparison with the case where the nonaqueous electrolyte secondary battery is manufactured with the use of the first collector plate 131 and the second collector plate 132. Accordingly, it is possible to prevent heat shrinkage of the separator 15 due to the application of the energy beam, thereby making it possible to further prevent occurrence of internal short-circuit. Accordingly, the case where the nonaqueous electrolyte secondary battery is manufactured with the use of the collector plate 31 is preferable.

Note that at least one of the positive collector plate 31 and the negative collector plate 71 should have the configuration described in the present embodiment. Preferably, the positive collector plate 31 has the configuration described in the present embodiment. Since the surface tension working on the molten material of aluminum is smaller than the surface tension working on the molten material of copper, the molten material of the positive collector plate more easily falls down toward the electrode body than the molten material of the negative collector plate. If the positive collector plate 31 has the configuration described in the present embodiment, it is possible to effectively prevent the molten material of the positive collector plate 31 from falling down toward the electrode body 11. Accordingly, it is possible to obtain the effect described in the present embodiment effectively. The same can be applied to the after-mentioned second and third embodiments.

Further, the welded portion 43 should be formed in at least part of the corner portion 37, but it is preferable that the welded portion 43 be formed over the whole corner portion 37. Accordingly, it is possible to secure the connection strength between the exposed portion 13D and the collector plate 31, so that the electric characteristics of the nonaqueous electrolyte secondary battery are further improved. The same can be applied to the after-mentioned second and third embodiments.

Further, the collector plate 31 may be used as a collector plate connected to a laminating electrode body. Even in this case, it is possible to obtain the effect described in the present embodiment. The same can be applied to the after-mentioned second embodiment.

FIGS. 15 to 18 are plan views each illustrating a collector plate of a second embodiment of the present invention. Since the projection portions 35 of the first embodiment are formed in these collector plates, it is possible to obtain the effect described in the first embodiment. The following mainly describes a point different from the first embodiment.

Figure 15:
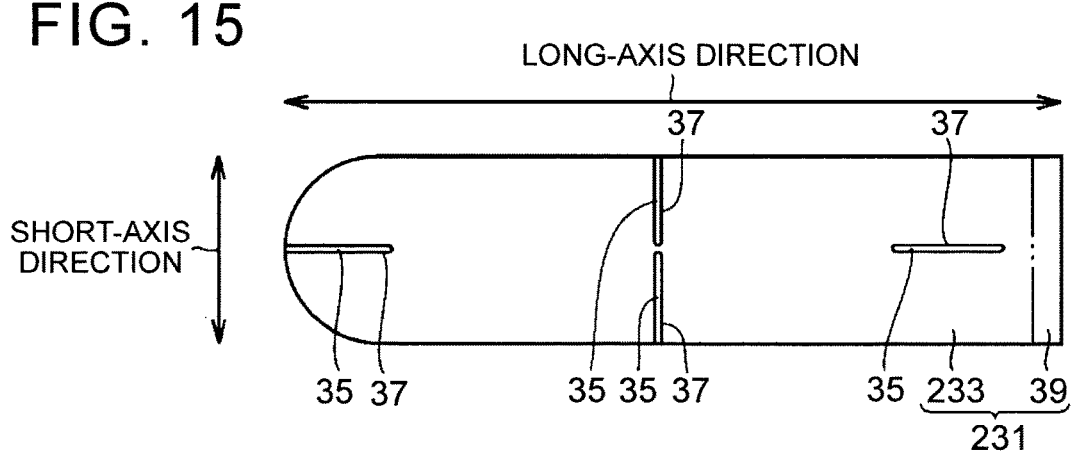
FIG. 15 is a plan view of a collector plate of one embodiment of the present invention.

In a facing portion 233 of a collector plate 231 illustrated in FIG. 15, projection portions 35 are provided not only at both ends of the facing portion 233 in the long-axis direction (a longitudinal direction of the facing portion 233), but also near a central part thereof in the long-axis direction. Accordingly, the number of welded portions 43 is larger than the first embodiment, so that a connection state between the exposed portion 13D and the collector plate 231 is easily maintained. Accordingly, the performance of a nonaqueous electrolyte secondary battery further increases.

The projection portions 35 provided near the center in the long-axis direction are placed side by side with an interval in the short-axis direction (a short direction of the facing portion 233), and extend in the short-axis direction. In the vicinity of the center in the long-axis direction, the positive electrode 13, the separator 15, and the negative electrode 17 extend in the long-axis direction. Accordingly, also in the vicinity of the center in the long-axis direction, the longitudinal direction (the short-axis direction) of the projection portions 35 and the longitudinal direction (the long-axis direction) of the exposed portion 13D intersect with each other in a plan view.

Figure 16:
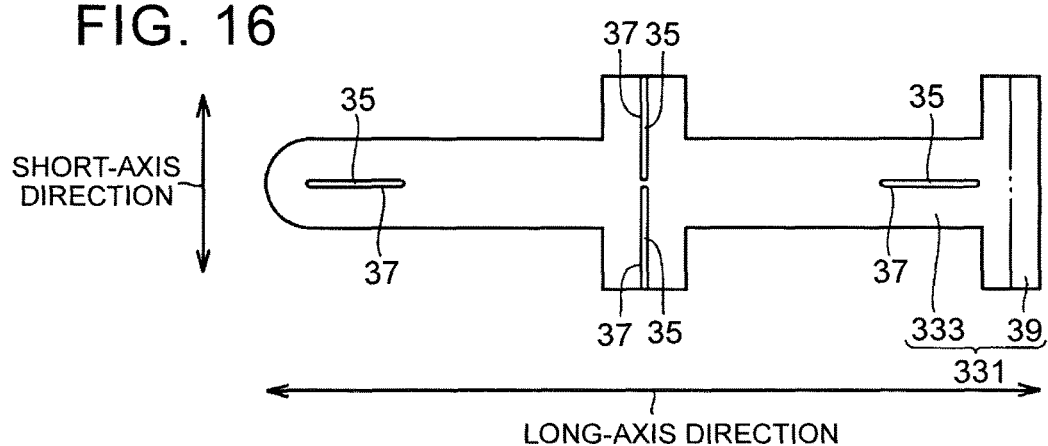
FIG. 16 is a plan view of a collector plate of one embodiment of the present invention.

A facing portion 333 of a collector plate 331 illustrated in FIG. 16 is formed by partially removing part of the facing portion 233 of the collector plate 231 illustrated in FIG. 15 which part is not provided with the projection portion 35. Hereby, lightweighting of a nonaqueous electrolyte secondary battery can be achieved. Further, the impregnating ability of the electrolyte to the electrode body 11 is increased, thereby also increasing gas discharge characteristics of the electrode body 11.

Figure 17:
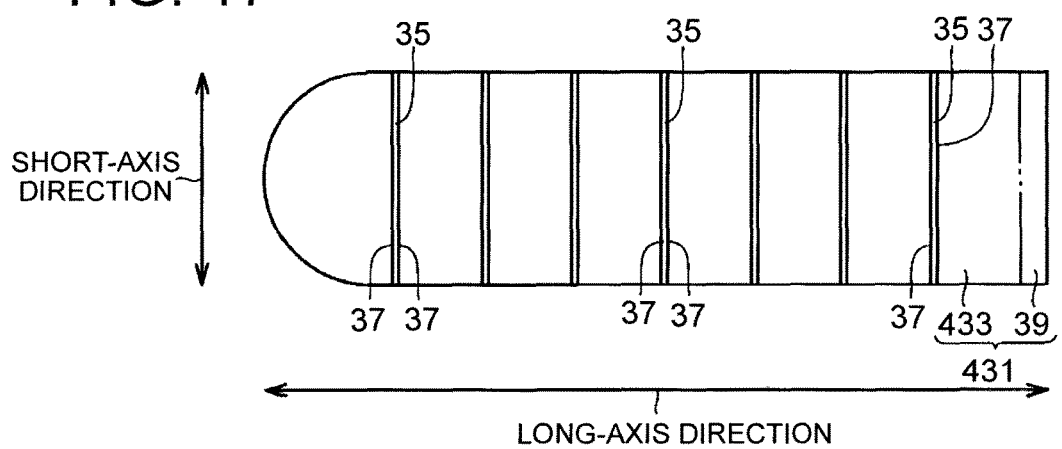
FIG. 17 is a plan view of a collector plate of one embodiment of the present invention.
Figure 18:
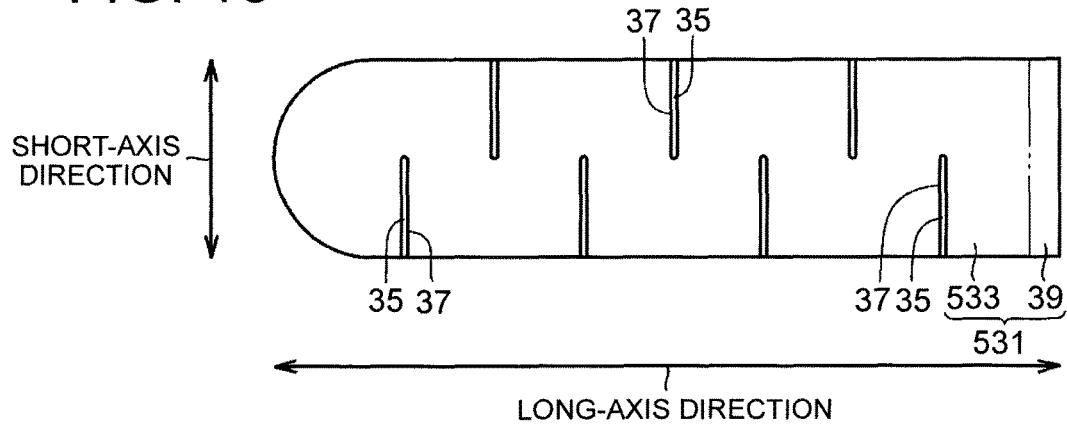
FIG. 18 is a plan view of a collector plate of one embodiment of the present invention.

In a facing portion 433 of a collector plate 431 illustrated in FIG. 17, projection portions 35 are provided in part except for end portions of the facing portion 433 in the long-axis direction at intervals in the long-axis direction, and extend in the short-axis direction. Further, in a facing portion 533 of a collector plate 531 illustrated in FIG. 18, projection portions 35 are provided in part except for end portions of the facing portion 533 in the long-axis direction at intervals in the long-axis direction, and extend from peripheral edges of a surface of the facing portion 533 to a middle thereof in the short-axis direction. In the part except for the end portions in the long-axis direction, the positive electrode 13, the separator 15, and the negative electrode 17 extend in the long-axis direction. On that account, in each of the collector plates 431, 531, the longitudinal direction (the short-axis direction) of the projection portions 35 and the longitudinal direction (the long-axis direction) of the exposed portion 13D intersect with each other in a plan view.

Figure 19:
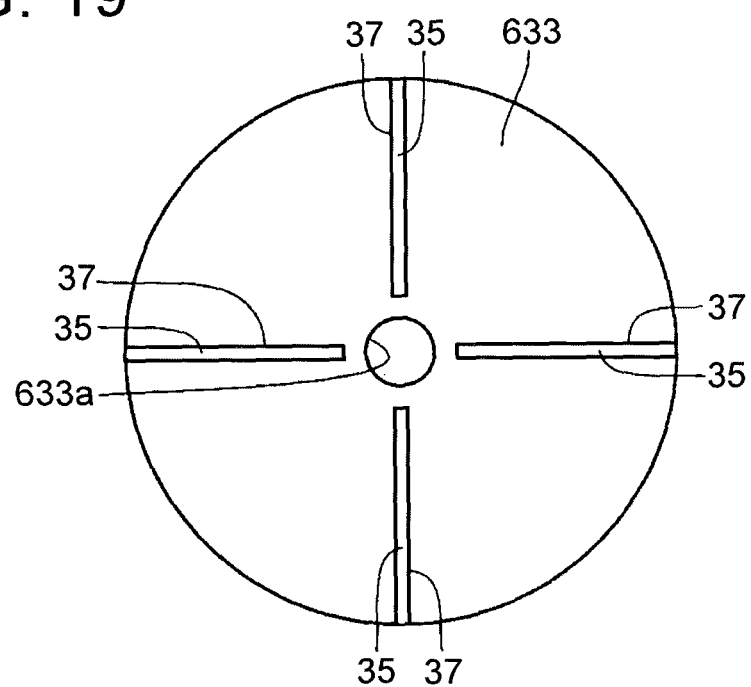
FIG. 19 is a plan view of a collector plate of one embodiment of the present invention.
Figure 20:
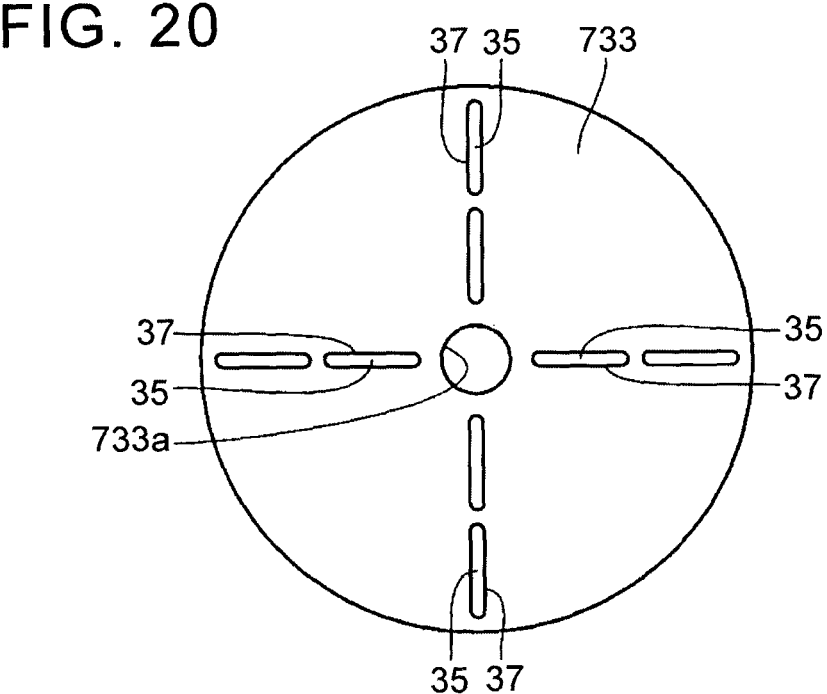
FIG. 20 is a plan view of a collector plate of one embodiment of the present invention.
Figure 21:
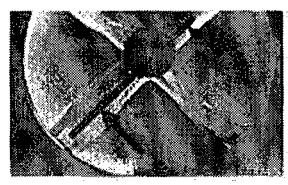
FIG. 21 is a plane image illustrating a conventional welding method of a collector plate and an exposed portion.
Figure 22:
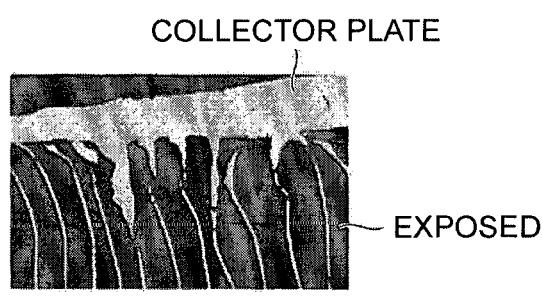
FIG. 22 is a side image illustrating a deficiency.

FIGS. 19 and 20 are plan views each illustrating a collector plate of a third embodiment of the present invention. The collector plates of the present embodiment are used for a cylindrical electrode body. Since the projection portions 35 of the first embodiment are formed in both of the collector plates, it is possible to obtain the effect described in the first embodiment. The following mainly describes a point different from the first embodiment.

The cylindrical electrode body is formed such that a positive electrode 13 and a negative electrode 17 are wound with a separator 15 sandwiched therebetween. Accordingly, an outer shape of that end surface of the cylindrical electrode body which is placed at an axial end of the cylindrical electrode body is circular. Accordingly, it is preferable that outer shapes of facing portions 633, 733 be circular.

In the cylindrical electrode body, a hollow portion is formed because a winding shaft is removed. Accordingly, a through hole 633a, 733a is formed in that part of the facing portion 633, 733 which is opposed to the hollow portion.

In the facing portion 633 illustrated in FIG. 19, projection portions 35 extend, in a radial direction of the facing portion 633, from a peripheral edge of a surface of the facing portion 633 toward the through hole 633a. In the facing portion 733 illustrated in FIG. 20, projection portions 35 are provided at intervals in a radial direction of the facing portion 733, and extend in the radial direction of the facing portion 733. In the cylindrical electrode body, an exposed portion 13D extends in a winding direction thereof. Accordingly, in each of the collector plates, the longitudinal direction of the projection portions 35 (the radial direction of the facing portion 633) and the longitudinal direction of the exposed portion 13D (the winding direction of the electrode body 11) intersect with each other in a plan view.

It should be considered that the embodiments described herein are just examples in all respects and are not limitative. A scope of the present invention is shown by Claims, not by the descriptions, and intended to include all modifications made within the meaning and scope equivalent to Claims. Further, the first embodiment and the second embodiment may be combined with each other. For example, in a nonaqueous electrolyte secondary battery, a positive collector plate may be the collector plate of the first embodiment, and a negative collector plate may be any one of the collector plates of the second embodiment. Further, in a nonaqueous electrolyte secondary battery, a positive collector plate may be the collector plate illustrated in FIG. 15, and a negative collector plate may be the collector plate illustrated in FIG. 16.

It is preferable that the nonaqueous electrolyte secondary battery be a lithium ion secondary battery having a battery capacity of 3.6 Ah, for example. It is preferable that the positive electrode have a well-known configuration as a positive electrode of the lithium ion secondary battery. It is preferable that the positive electrode collector be aluminum foil or aluminum alloy foil having a thickness of 15 μm, for example. It is preferable that the positive electrode mixture layer contain a positive-electrode active material (e.g., lithium cobalt oxide), a conductant agent (carbon powder), and polyvinylidene fluoride (a binder). It is preferable that respective contents of the positive-electrode active material, the conductant agent, and the binder in the positive electrode mixture layer be well-known contents as respective contents of a positive-electrode active material, a conductant agent, and a binder in a positive electrode mixture layer of the lithium ion secondary battery.

It is preferable that the negative electrode have a well-known configuration as a negative electrode of the lithium ion secondary battery. It is preferable that the negative electrode collector be copper foil having a thickness of 10 μm, for example. It is preferable that the negative electrode mixture layer contain a negative-electrode active material (e.g., natural graphite) and a binder (polyvinylidene fluoride). It is preferable that respective contents of the negative-electrode active material and the binder in the negative electrode mixture layer be well-known contents as respective contents of a negative-electrode active material and a binder in a negative electrode mixture layer of the lithium ion secondary battery.

It is preferable that the separator have a well-known configuration as a separator of the lithium ion secondary battery. The separator may be constituted by laminating two or more layers made of different resins, or may include a heat-resistant layer having a heat resisting temperature of 150° or more.

It is preferable that the nonaqueous electrolyte have a well-known configuration as a nonaqueous electrolyte of the lithium ion secondary battery. For example, it is preferable that the nonaqueous electrolyte include a solvent and lithium salt. It is preferable that the solvent include at least one organic solvent, and a gel solvent may be used as the solvent. An example of the nonaqueous electrolyte is a nonaqueous electrolyte including a mixed solvent (e.g., a volume ratio is about 1:1) of ethylene carbonate and diethyl carbonate, and $LiPF_6$ of about 1 mol/liter.

It is preferable that the positive collector plate have a well-known configuration as a positive collector plate of the lithium ion secondary battery, and be made of aluminum, for example. The size of the positive collector plate is not limited, and may have, for example, a thickness of 0.6 mm, a width of 12 mm, and a length (a length of the positive electrode facing portion) of 50 mm.

It is preferable that the negative collector plate have a well-known configuration as a negative collector plate of the lithium ion secondary battery, and be made of copper, for example. The size of the negative collector plate is not limited, and may have, for example, a thickness of 0.6 mm, a width of 12 mm, and a length (a length of the negative electrode facing portion) of 50 mm.

An example of the size of the projection portion formed in the positive collector plate is such that a width is 0.5 mm and a height is 0.5 mm. The size of the projection portion formed in the negative collector plate may be the same as or different from the size of the projection portion formed in the positive collector plate, and an example thereof is such that a width is 0.5 mm and a height is 0.5 mm.

The invention claimed is:

1. An electrical storage device comprising:
   an electrode including a mixture layer and a collector,
      the collector including an exposed portion, wherein the exposed portion is exposed from the mixture layer in one end of the electrode in a width direction; and
   a collector plate including a facing portion, a projection portion, and a corner portion, wherein
      the facing portion is opposed to a tip end surface of the exposed portion,
      the projection portion extends from the facing portion and towards an axially inner side of the electrode body so as to project toward the exposed portion of the collector,
      the corner portion is disposed at a boundary between the facing portion and the projection portion, and
      the collector plate is connected to the exposed portion by being welded to the exposed portion in at least part of the corner portion, the welding is carried out by applying an energy beam to the boundary such that a molten material is formed which contacts a corner of the tip end surface of the exposed portion, wherein the molten material only contacts the corner of the tip end surface of the exposed portion without contacting other portions of the exposed portion.

2. The electrical storage device according to claim 1, wherein:
   an angle formed between the facing portion and the projection portion at the corner portion on an inner side of the collector plate, in the axial direction of the electrode body, is not less than 90° but not more than 120°.

3. The electrical storage device according to claim 1, wherein:
   a longitudinal direction of the exposed portion and a longitudinal direction of the projection portion intersect with each other in a plan view.

4. The electrical storage device according to claim 1, wherein:
   an angle formed between the facing portion and the projection portion at the corner portion on an inner side of the collector plate, in the axial direction of the electrode body, is greater than 90° but not more than 110°.

5. The electrical storage device according to claim 1, further comprising:
   a plurality of projection portions wherein the plurality of projection portions are provided at intervals in a long-axis direction and extend across the facing portion in a short-axis direction.

6. The electrical storage device according to claim 1, further comprising:
   a plurality of projection portions wherein the plurality of projection portions are provided at intervals in a long-axis direction, and extend from a peripheral edge of the facing portion to a middle thereof, in the short-axis direction.

7. A manufacturing method for an electrical storage device,
   the electrical storage device including an electrode and a collector plate,
      the electrode including a mixture layer and a collector,
         the collector including an exposed portion, wherein the exposed portion is exposed from the mixture layer in one end of the electrode in a width direction, the collector plate including a facing portion and a projection portion, the facing portion being opposed to a tip end surface of the exposed portion, the projection portion extending from the facing portion and towards an axially inner side of the electrode body so as to project toward the exposed portion of the collector, the manufacturing method comprising:

(a) preparing the electrode; and (b) applying an energy beam to a boundary between the facing portion and the projection portion such that a molten material is formed which contacts a corner of the tip end surface of the exposed portion, wherein the molten material only contacts the corner of the tip end surface of the exposed portion without contacting other portions of the exposed portion.

8. The manufacturing method according to claim 7, the collector plate further including a corner portion, wherein the corner portion is disposed at the boundary between the facing portion and the projection portion, the projection portion extending from the facing portion, the manufacturing method further comprising:

preparing the collector plate, wherein:

the energy beam is applied to at least part of the corner portion.

9. The manufacturing method according to claim 8, wherein:

an angle formed between the facing portion and the projection portion at the corner portion on an inner side of the collector plate, in the axial direction of the electrode body, is not less than 90° but not more than 120°.

10. The manufacturing method according to claim 7, further comprising:

placing the collector plate and the exposed portion such that a longitudinal direction of the exposed portion and a longitudinal direction of the projection portion intersect with each other in a plan view.

11. The manufacturing method according to claim 7, further comprising:

providing a plurality of projection portions at intervals in a long-axis direction, wherein the projection portions extend across the facing portion in a short-axis direction.

12. The manufacturing method according to claim 7, further comprising:

providing a plurality of projection portions at intervals in a long-axis direction, wherein the projection portions extend from a peripheral edge of the facing portion to a middle thereof, in the short-axis direction.

* * * * *